United States Patent
Yoshida

(10) Patent No.: US 10,747,188 B2
(45) Date of Patent: Aug. 18, 2020

(54) INFORMATION PROCESSING APPARATUS, INFORMATION PROCESSING METHOD, AND, RECORDING MEDIUM

(71) Applicant: NEC Corporation, Tokyo (JP)

(72) Inventor: Shinichiro Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 15/557,951

(22) PCT Filed: Mar. 15, 2016

(86) PCT No.: PCT/JP2016/001466
§ 371 (c)(1),
(2) Date: Sep. 13, 2017

(87) PCT Pub. No.: WO2016/147656
PCT Pub. Date: Sep. 22, 2016

(65) Prior Publication Data
US 2018/0059628 A1    Mar. 1, 2018

(30) Foreign Application Priority Data

Mar. 16, 2015 (JP) ................................. 2015-052214

(51) Int. Cl.
*G06F 17/10* (2006.01)
*G05B 17/02* (2006.01)
(Continued)

(52) U.S. Cl.
CPC ............... *G05B 17/02* (2013.01); *G05B 1/01* (2013.01); *G05B 23/0243* (2013.01);
(Continued)

(58) Field of Classification Search
CPC ........ G06F 17/02; G06F 17/11; G06F 11/006; G06F 11/30; G05B 1/01
(Continued)

(56) References Cited

U.S. PATENT DOCUMENTS 7,076,695 B2 *  7/2006  McGee ............... G06F 11/0709
                                                   702/179
2013/0120449 A1 *  5/2013  Ihara .................. G06F 11/0727
                                                   345/633
(Continued)

FOREIGN PATENT DOCUMENTS

JP       07-110708     4/1995
JP       2001-184121   7/2001
(Continued)

OTHER PUBLICATIONS

International Search Report, PCT/JP2016/001466, dated Jun. 7, 2016.

*Primary Examiner* — Andre Pierre Louis
(74) *Attorney, Agent, or Firm* — Young & Thompson

(57) ABSTRACT

An abnormality of a system is caused by a failure or aged deterioration is determined. A monitoring apparatus includes a model storage unit, a model generation unit, and a determination unit. The model storage unit stores a monitoring model that is a model for one point in time. The model indicates a relationship among a plurality of metrics of a system. The model generation unit generates a comparison model that is the model for a point in time at which the relationship among the plurality of metrics does not conform to the monitoring model. The determination unit determines that the relationship among metrics in the system has changed in a case where the comparison model indicates the relationship among metrics among which the monitoring model indicates the relationship, and outputs a result of the determination.

6 Claims, 13 Drawing Sheets

(51) Int. Cl.
*G05B 23/02* (2006.01)
*G06F 11/07* (2006.01)
*G06F 11/34* (2006.01)
*G05B 1/01* (2006.01)
*G06F 11/00* (2006.01)
*G06F 11/30* (2006.01)
*G06F 17/11* (2006.01)

(52) U.S. Cl.
CPC ........ *G06F 11/006* (2013.01); *G06F 11/0706* (2013.01); *G06F 11/0751* (2013.01); *G06F 11/0769* (2013.01); *G06F 11/30* (2013.01); *G06F 11/3447* (2013.01); *G06F 11/3452* (2013.01); *G06F 17/11* (2013.01)

(58) Field of Classification Search
USPC .......................................................... 703/2
See application file for complete search history.

(56) References Cited

U.S. PATENT DOCUMENTS

2015/0241511 A1\* 8/2015 Bickford ................. H01L 22/10
702/117
2016/0378583 A1\* 12/2016 Nakano ................... G06F 11/34
714/37

FOREIGN PATENT DOCUMENTS

| JP | 4872944 | 2/2012 |
| JP | 5267736 | 8/2013 |
| JP | 5459431 | 4/2014 |
| WO | WO2014/091952 | 6/2014 |

\* cited by examiner

Fig. 6

132 MONITORING MODEL

| INPUT METRICS | OUTPUT METRICS | CORRELATION FUNCTIONS |
|---|---|---|
| A | B | y(t)=x(t)+1 |
| A | C | y(t)=2x(t)+1 |
| A | D | y(t)=x(t)+5 |
| C | E | y(t)=x(t)+2 |
| C | F | y(t)=3x(t)+3 |

Fig. 7

133 COMPARISON MODEL (TIME T11)

| INPUT METRICS | OUTPUT METRICS | CORRELATION FUNCTIONS |
|---|---|---|
| A | B | y(t)=x(t)+10 |
| A | C | y(t)=3x(t)+5 |
| A | D | y(t)=x(t)+5 |
| C | E | y(t)=x(t−1)+2 |
| C | F | y(t)=3x(t)+3 |

Fig. 9

134 DETERMINATION RESULT HISTORY

| ABNORMALITY DETECTION TIME | DETERMINATION RESULT |
|---|---|
| T11 | RELATIONSHIP CHANGE |
| T12 | RELATIONSHIP CHANGE |
| ⋮ | ⋮ |
| T21 | FAILURE |
| ⋮ | ⋮ |

Fig. 10

RELATION EXPRESSION COMPARISON RESULT

| ABNORMALITY DETECTION TIME | | | | T11 |
|---|---|---|---|---|
| INPUT METRICS | OUTPUT METRICS | CORRELATION FUNCTIONS | | CHANGE IN CORRELATION FUNCTION |
| | | MONITORING MODEL | COMPARISON MODEL | |
| A | B | y(t)=x(t)+1 | y(t)=x(t)+10 | yes |
| A | C | y(t)=2x(t)+1 | y(t)=3x(t)+5 | yes |
| A | D | y(t)=x(t)+5 | y(t)=x(t)+5 | no |
| C | E | y(t)=x(t)+2 | y(t)=x(t−1)+2 | yes |
| C | F | y(t)=3x(t)+3 | y(t)=3x(t)+3 | no |

| ABNORMALITY DETECTION TIME | | | | T21 |
|---|---|---|---|---|
| INPUT METRICS | OUTPUT METRICS | CORRELATION FUNCTIONS | | CHANGE IN CORRELATION FUNCTION |
| | | MONITORING MODEL | COMPARISON MODEL | |
| A | B | y(t)=x(t)+1 | y(t)=x(t)+1 | no |
| A | C | y(t)=2x(t)+1 | y(t)=2x(t)+1 | no |
| A | D | y(t)=x(t)+5 | y(t)=x(t)+5 | no |
| C | E | y(t)=x(t)+2 | --- | --- |
| C | F | y(t)=3x(t)+3 | --- | --- |

Fig. 12

133 COMPARISON MODEL (TIME T21)

| INPUT METRICS | OUTPUT METRICS | CORRELATION FUNCTIONS |
|---|---|---|
| A | B | y(t)=x(t)+1 |
| A | C | y(t)=2x(t)+1 |
| A | D | y(t)=x(t)+5 |

INFORMATION PROCESSING APPARATUS, INFORMATION PROCESSING METHOD, AND, RECORDING MEDIUM

TECHNICAL FIELD

The present invention relates to an information processing apparatus, an information processing method, and a recording medium.

BACKGROUND ART

In a plant system such as a chemical plant or an oil refinery plant, dust and the like may adhere to the inner wall of the piping due to aged deterioration, resulting in problems in the operation of the plant. For this reason, inspection and cleaning of piping is performed with a regular interval. The interval for the inspection and cleaning is generally determined according to empirical rules, and it is not clear whether the interval is appropriate or not. Therefore, in order to optimize the interval for the inspection and cleaning and to reduce maintenance cost, detection of occurrence of the aged deterioration is needed.

For example, an invariant relation analysis described in PTL 1 is known as a technique for detecting an abnormality of a plant system. In the invariant relation analysis, a correlation model indicating statistical relation between metrics (performance indicators) of the system is generated, and a difference between the behavior of the system and the correlation model is detected as a system abnormality.

As a related technique, PTL 2 discloses a technique for estimating a cause of failure by using information about correlation in which correlation destruction is detected during occurrence of failure, in the invariant relation analysis. PTL 3 discloses a technique for detecting a sign of failure of a system by using distributions of correlation destruction in normal state and in abnormal state, in the invariant relation analysis.

CITATION LIST

Patent Literature

[PTL1] Japanese Patent No. 4872944
[PTL2] Japanese Patent No. 5267736
[PTL3] Japanese Patent No. 5459431

SUMMARY OF INVENTION

Technical Problem

When the invariant relation analysis described in PTL 1 above is applied to the plant system, an abnormality of the system (a state in which a difference occurs between the behavior of the system and the model) can be detected. However, there is a problem in that it cannot be determined as to whether the detected abnormality of the system is caused by a failure or aged deterioration.

An object of the present invention is to solve the above problem and provide an information processing apparatus, an information processing method, and a recording medium capable of determining whether an abnormality of a system is caused by a failure or aged deterioration.

Solution to Problem

An information processing apparatus according to an exemplary aspect of the present invention includes: model storage means for storing a first model that is a model for one point in time, the model indicating a relationship among a plurality of metrics of a system; model generation means for generating a second model that is the model for a point in time at which the relationship among the plurality of metrics does not conform to the first model; and determination means for determining that the relationship among metrics in the system has changed in a case where the second model indicates the relationship among metrics among which the first model indicates the relationship, and outputting a result of the determination.

An information processing method according to an exemplary aspect of the present invention includes: storing a first model that is a model for one point in time, the model indicating a relationship among a plurality of metrics of a system; generating a second model that is the model for a point in time at which the relationship among the plurality of metrics does not conform to the first model; and determining that the relationship among metrics in the system has changed in a case where the second model indicates the relationship among metrics among which the first model indicates the relationship, and outputting a result of the determination.

A computer readable storage medium according to an exemplary aspect of the present invention records thereon a program causing a computer to perform a method including: storing a first model that is a model for one point in time, the model indicating a relationship among a plurality of metrics of a system; generating a second model that is the model for a point in time at which the relationship among the plurality of metrics does not conform to the first model; and determining that the relationship among metrics in the system has changed in a case where the second model indicates the relationship among metrics among which the first model indicates the relationship, and outputting a result of the determination.

Advantageous Effects of Invention

An advantageous effect of the present invention is to determine whether an abnormality of a system is caused by a failure or aged deterioration.

BRIEF DESCRIPTION OF DRAWINGS

FIG. 6 is a diagram illustrating an example of a monitoring model 132 in the example embodiment of the present invention.

FIG. 7 is a diagram illustrating an example of a comparison model 133 in the example embodiment of the present invention.

FIG. 9 is a diagram illustrating an example of a determination result history 134 in the example embodiment of the present invention.

FIG. 10 is a diagram illustrating an example of a relation expression comparison result 135 in the example embodiment of the present invention.

FIG. 12 is a diagram illustrating another example of a comparison model 133 in the example embodiment of the present invention.

DESCRIPTION OF EMBODIMENTS

First Example Embodiment

An example embodiment of the present invention will be described.

Figure 2:
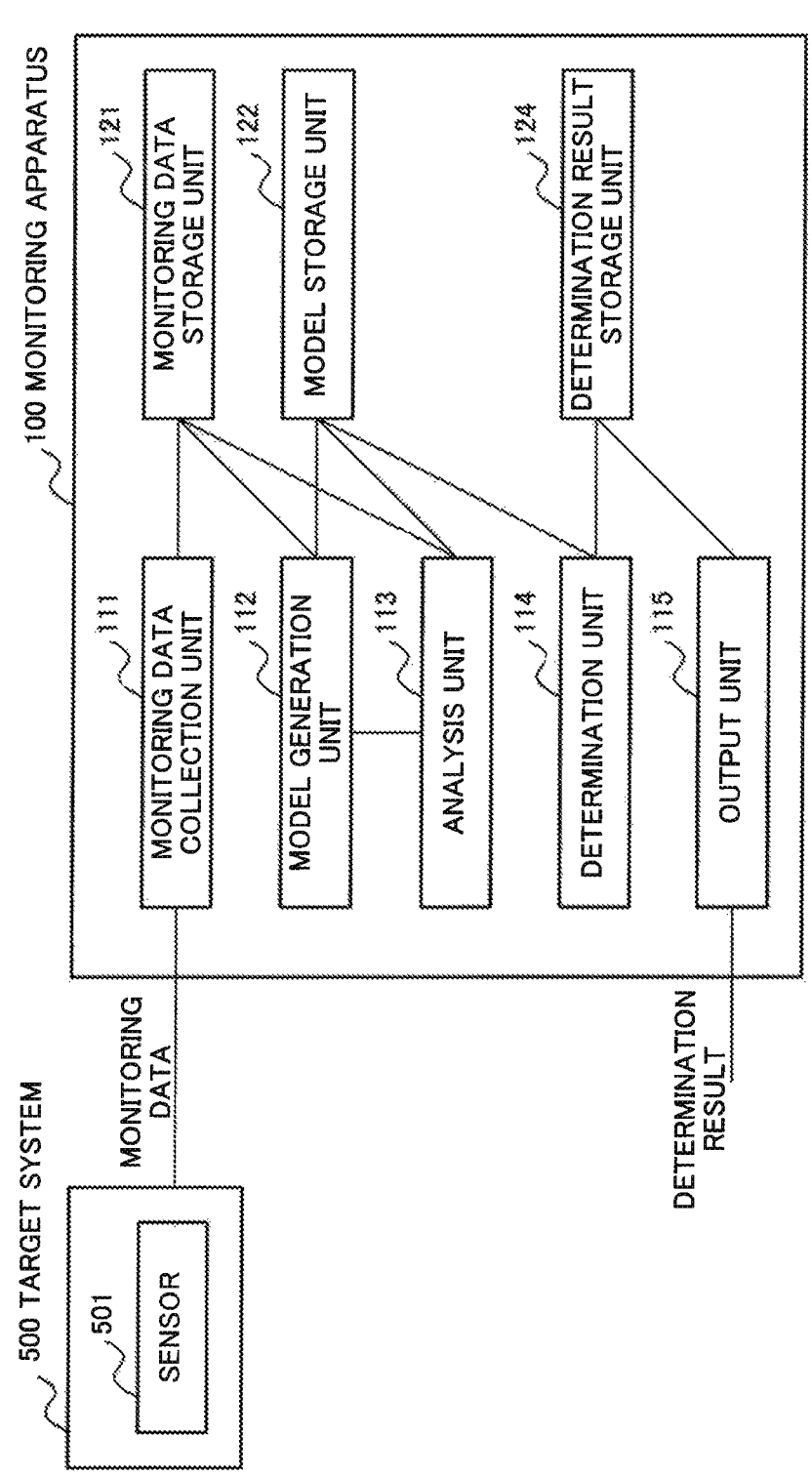
FIG. 2 is a block diagram illustrating a configuration of a monitoring system 1 according to the example embodiment of the present invention.

First, a configuration of the example embodiment of the present invention will be described. FIG. 2 is a block diagram illustrating a configuration of a monitoring system 1 according to the example embodiment of the present invention.

As illustrated in FIG. 2, the monitoring system 1 includes a monitoring apparatus 100 and a target system 500 (also simply referred to as a system). The monitoring apparatus 100 and the target system 500 are connected by a network or the like. The monitoring system 1 is an information processing system according to one example embodiment of the present invention. The monitoring apparatus 100 is an information processing apparatus according to one example embodiment of the present invention.

The monitoring system 1 is, for example, a plant system. In this case, the target system 500 is a plant such as, for example, a chemical plant, a petroleum refined plant, and a steel plant, that performs predetermined processing.

The target system 500 includes sensors 501. The sensors 501 measure values of a plurality of metrics (indexes), which are monitoring targets in the target system 500, with a regular interval. Such metrics may include, for example, temperature, pressure, vibration, power, voltage, current, and the like of each unit of the target system 500. Such metrics may also include weight, amount, ratio, and the like of raw materials and products in each unit of the target system 500. Hereinafter, a plurality of metrics of the monitoring targets may also be referred to as monitoring data.

The monitoring apparatus 100 detects an abnormality of the target system 500.

The monitoring apparatus 100 includes a monitoring data collection unit 111, a model generation unit 112, an analysis unit 113, a determination unit 114, an output unit 115, a monitoring data storage unit 121, a model storage unit 122, and a determination result storage unit 124.

The monitoring data collection unit 111 collects a time series of monitoring data from the target system 500.

The monitoring data storage unit 121 stores the collected time series of the monitoring data.

The model generation unit 112 generates, based on the time series of the monitoring data for a predetermined length of modeling period stored in the monitoring data storage unit 121, a model representing a statistical relationship (hereinafter simply referred to as a relationship) among a plurality of metrics of the monitoring target. The model generation unit 112 generates, as the model, a monitoring model 132 (first model) and a comparison model 133 (second model). The monitoring model 132 is the model generated based on the monitoring data during normal operation of the target system 500. The comparison model 133 is the model generated based on the monitoring data during detection of an abnormality of the target system 500. The abnormality of the target system 500 is a state in which the relationship among the metrics of the target system 500 does not conform to the monitoring model 132 (there is a difference between the behavior of the target system 500 and the monitoring model 132).

In the example embodiment of the present invention, the model generation unit 112 generates a correlation model as the model. The correlation model is a set of correlation functions which is a relation expression indicating a correlation of each pair of the plurality of metrics of the monitoring target.

The correlation function is expressed, for example, by the expression in Math 1, where a value at a time t of one of metrics (an input metric) of a metric pair is represented by x (t), and a value of the time t of the other of the metrics (an output metric) of the metric pair is represented by y (t).

$$y(t) = \sum_{i=1}^{n} a_i y(t-i) + \sum_{j=1}^{m} b_j x(t-k-j) + c \quad \text{[Math 1]}$$

In Math 1, n (n is an integer of 1 or more), m (m is an integer of 1 or more), k (k is an integer equal to or more than zero) are parameters of the correlation function, and $a_i(1 \le i \le n)$, $b_j(1 \le j \le m)$, c are coefficients of the correlation function.

The model generation unit 112 calculates correlation functions for all the pairs of the plurality of metrics of the monitoring targets, in a similar manner to the operation management apparatus of PTL 1, for example. The model generation unit 112 calculates, for each pair of the metrics, correlation functions for a plurality of combinations of parameters n, m, k, and selects a correlation function for a combination of parameters that minimizes a conversion error, as a correlation function for the pair, for example. Furthermore, the model generation unit 112 extracts correlation functions (effective correlation functions) whose conversion error is equal to or less than a predetermined threshold value from correlation functions for all the respective pairs of the metrics, and sets a set of the extracted correlation functions as a correlation model.

The model storage unit 122 stores the monitoring model 132 and comparison model 133 generated by the model generation unit 112.

The analysis unit 113 detects an abnormality of the target system 500 using the monitoring model 132.

The analysis unit 113 detects the abnormality of the target system 500 by detecting correlation destruction for correlation functions included in the monitoring model 132, for newly acquired monitoring data, like the operation management apparatus of PTL 1. In this detection, the analysis unit 113 calculates, for each pair of metrics, a difference (conversion error due to a correlation function) between a prediction value of an output metric obtained by inputting a measurement value of an input metric into a correlation function and the measurement value of the output metric. The analysis unit 113 detects correlation destruction for the correlation function of the pair when the difference is equal to or more than a predetermined value. Then, in a case where the number of correlation functions in which correlation destruction is detected is equal to or more than a predetermined threshold value, the analysis unit 113 determines that the target system 500 is in abnormal state, for example.

The analysis unit 113 commands the model generation unit 112 to generate the comparison model 133 when an abnormality for the monitoring model 132 is detected.

The determination unit 114 determines a cause of the abnormality by comparing the monitoring model 132 and the comparison model 133 when the abnormality for the monitoring model 132 is detected.

In this comparing, in a case where the comparison model 133 also indicates a relationship among the same metrics as metrics among which the monitoring model 132 indicates a relationship, it is considered that a degree of a relation among the metrics has changed due to aged deterioration or the like while the relation among the metrics is preserved, for example. On the other hand, in a case where the comparison model 133 does not indicate a relationship among the same metrics as metrics among which the monitoring model 132 indicates a relationship, it is considered that a relationship among the metrics has disappeared due to a failure or the like.

Therefore, the determination unit 114 determines a cause of an abnormality of the target system 500 as follows. In a case where the comparison model 133 also indicates a relationship among metrics among which the monitoring model 132 indicates a relationship, and the number of correlation functions changed between the monitoring model 132 and the comparison model 133 is equal to or more than a predetermined threshold value, the determination unit 114 determines that the cause of the abnormality is "relationship change". In a case where the comparison model 133 does not indicate a relationship among metrics among which the monitoring model 132 indicates a relationship, the determination unit 114 determines that the cause of the abnormality is "failure".

In addition, the determination unit 114 determines as to whether "the comparison model 133 also indicates a relationship among the same metrics as metrics among which the monitoring model 132 indicates a relationship (hereinafter also referred to as a target relationship)" as follows. In a case where the comparison model 133 includes correlation functions for all the pairs of metrics of the monitoring model 132, the determination unit 114 determines that "the comparison model 133 also indicates the target relationship". In a case where the comparison model 133 does not include a correlation function for at least one pair among the pairs of metrics of the monitoring model 132, the determination unit 114 determines that "the comparison model 133 does not indicate the target relationship".

The determination result storage unit 124 stores a determination result history 134 generated by the determination unit 114 and a relation expression comparison result 135. The determination result history 134 indicates a history of determination results ("failure" or "relationship change"). The relation expression comparison result 135 indicates comparison results of correlation functions between the monitoring model 132 and the comparison model 133.

The output unit 115 outputs (displays) a determination result screen 200 indicating the determination result to a user or the like.

The monitoring apparatus 100 may be a computer including a CPU (Central Processing Unit) and a storage medium storing a program and operating under control based on a program.

Figure 3:
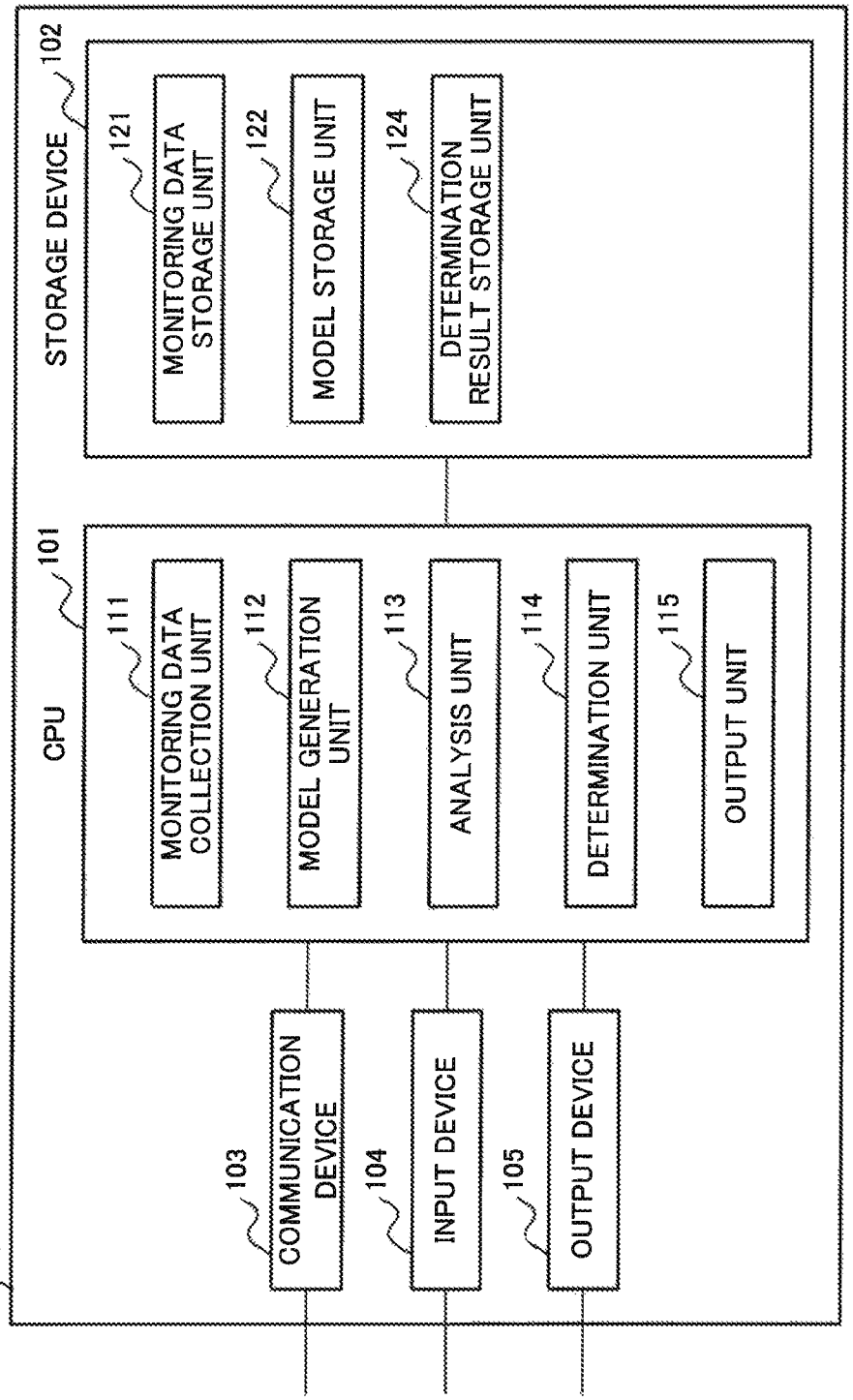
FIG. 3 is a block diagram illustrating a configuration of the monitoring apparatus 100 implemented on a computer according to the example embodiment of the present invention.

FIG. 3 is a block diagram illustrating a configuration of the monitoring apparatus 100 implemented on a computer according to the example embodiment of the present invention. The monitoring apparatus 100 includes a CPU 101, a storage device 102 (storage medium) such as a hard disk and a memory, a communication device 103 for performing data communication with another apparatus and the like, an input device 104 such as a keyboard, and an output device 105 such as a display.

The CPU 101 executes a computer program for implementing the functions of the monitoring data collection unit 111, the model generation unit 112, the analysis unit 113, the determination unit 114, and the output unit 115. The storage device 102 stores information stored in the monitoring data storage unit 121, the model storage unit 122, and the determination result storage unit 124. The communication device 103 receives monitoring data from the target system 500. The input device 104 accepts an instruction related to monitoring from the user or the like. The output device 105 outputs (displays) a determination result screen 200 for the user or the like.

It is noted that each constituent element of the monitoring apparatus 100 may be an independent logic circuit. In addition, each constituent element of the monitoring apparatus 100 may be dispersively arranged in a plurality of physical apparatuses connected via a wired or wireless channel.

Next, the operation of the example embodiment of the present invention will be described.

Figure 4:
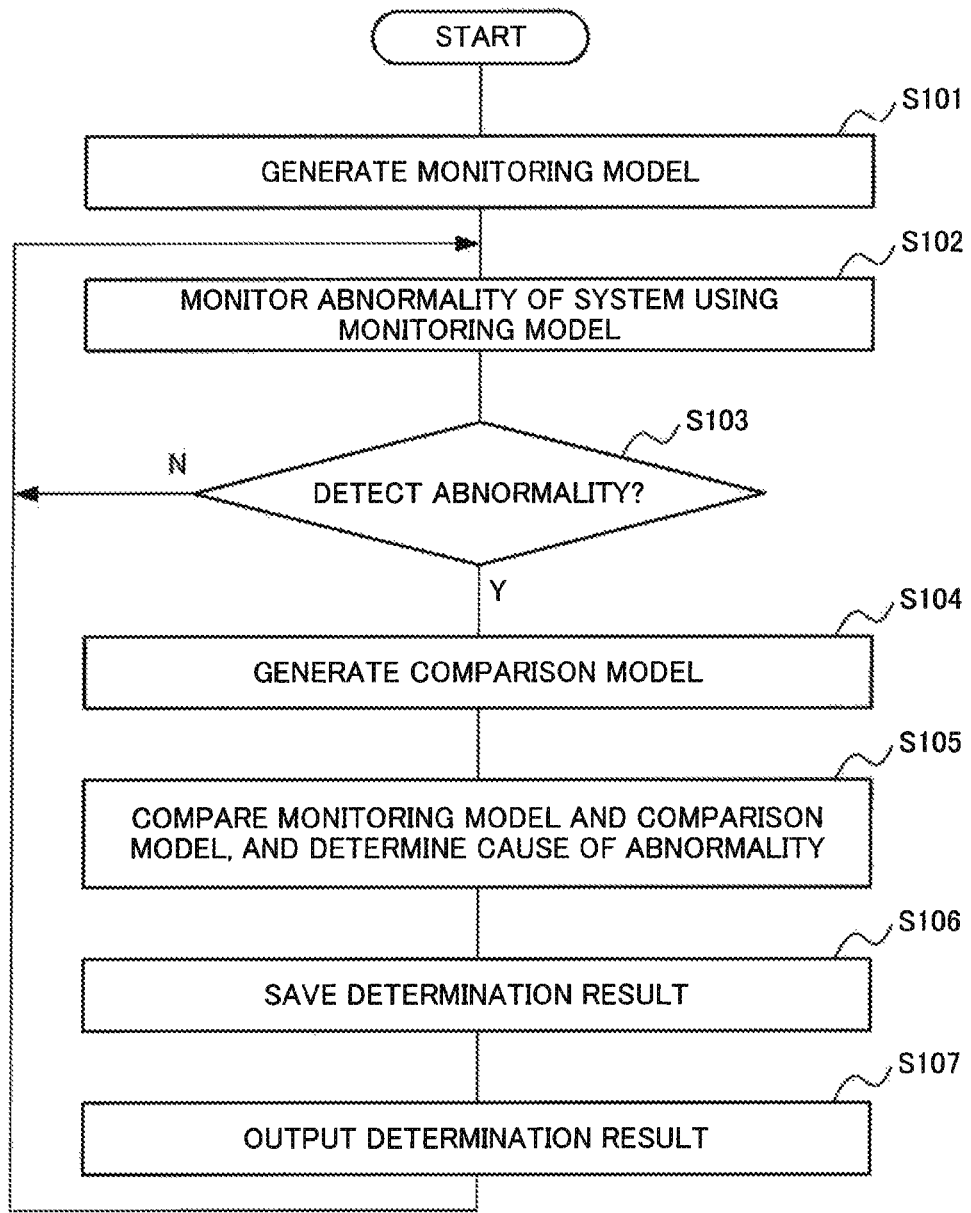
FIG. 4 is a flowchart illustrating processing of the monitoring apparatus 100 according to the example embodiment of the present invention.

FIG. 4 is a flowchart illustrating processing of the monitoring apparatus 100 according to the example embodiment of the present invention.

It is assumed that the monitoring data collection unit 111 regularly acquires value of monitoring data measured in the target system 500 and stores the values into the monitoring data storage unit 121.

The model generation unit 112 generates a monitoring model 132 (step S101). The model generation unit 112 saves the generated monitoring model 132 into the model storage unit 122.

In this step, the model generation unit 112 generates the monitoring model 132 based on monitoring data for a modeling period when the target system 500 is operating normally.

FIG. 6 is a diagram illustrating an example of the monitoring model 132 in the example embodiment of the present invention. In the monitoring model 132 of FIG. 6, correlation functions for pairs of input and output metrics "A, B", "A, C", "A, D", "C, E", and, "C, F" are set.

For example, the model generation unit 112 generates the monitoring model 132 as illustrated in FIG. 6.

The analysis unit 113 monitors an abnormality of the target system 500 for newly acquired monitoring data by using the monitoring model 132 (step S102).

When an abnormality is not detected in step S102 (step S103/N), the analysis unit 113 repeats the processing from step S102.

When an abnormality is detected in step S102 (step S103/Y), the analysis unit 113 commands the model generation unit 112 to generate a comparison model 133.

The model generation unit 112 generates the comparison model 133 (step S104). The model generation unit 112 saves the generated comparison model 133 in the model storage unit 122.

In this step, the model generation unit 112 generates the comparison model 133 based on monitoring data for a modeling period including the time the abnormality is detected or a modeling period close to the time the abnormality is detected (for example, immediately after the time the abnormality is detected), according to the same generation method as that of the monitoring model 132 described above.

FIG. 7 is a diagram illustrating an example of the comparison model 133 in the example embodiment of the present invention. In the comparison model 133 of FIG. 7, correlation functions for pairs of input and output metrics "A, B", "A, C", "A, D", "C, E", and, "C, F" are also set.

For example, for an abnormality detected at time T11, the model generation unit 112 generates the comparison model 133 as illustrated in FIG. 7.

The determination unit 114 compares the monitoring model 132 generated in step S101 with the comparison model 133 generated in step S104, and determines whether a cause of the abnormality is a failure in the target system 500 or a change of a relationship (step S105).

Figure 5:
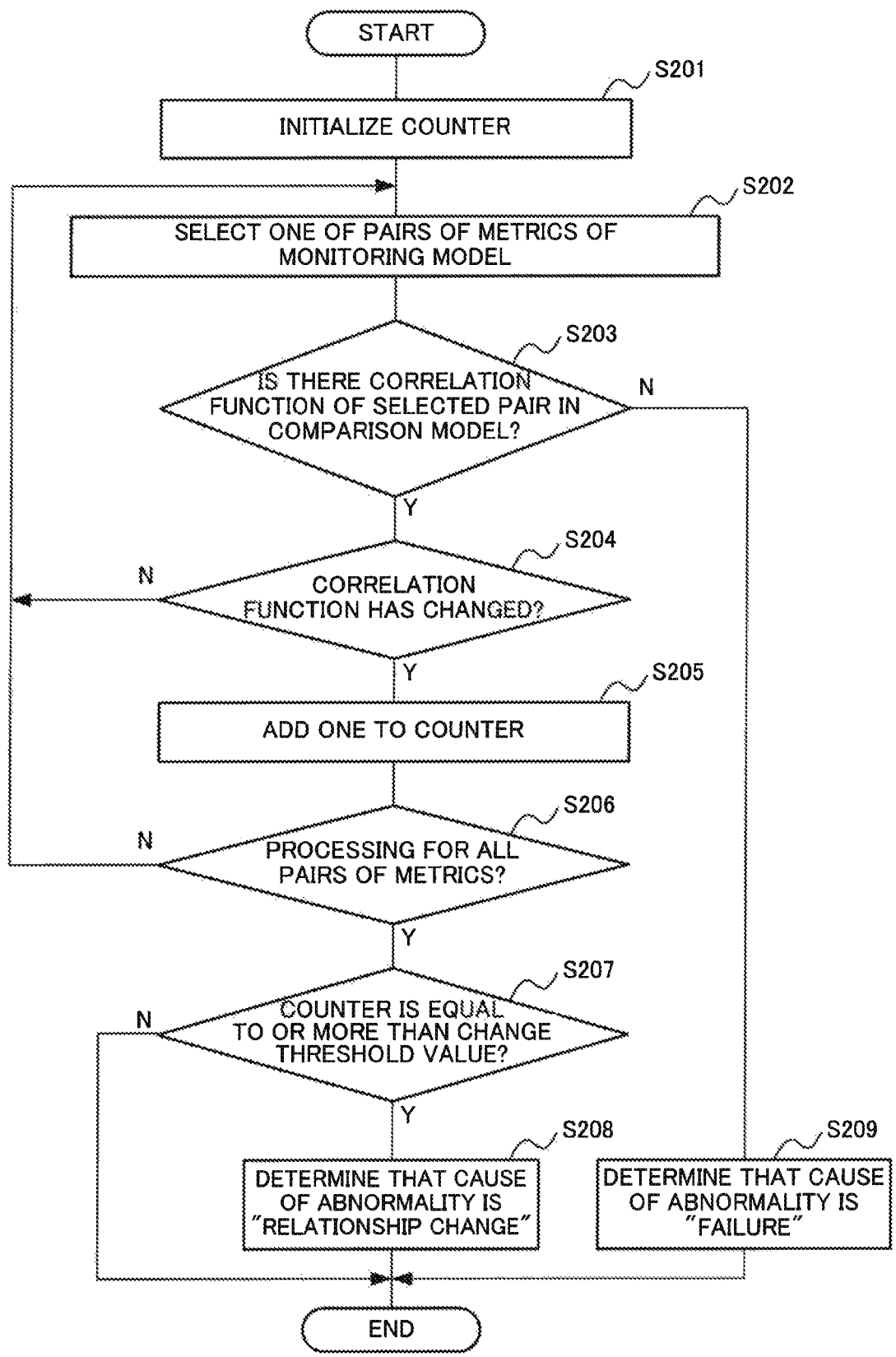
FIG. 5 is a flowchart illustrating details of the abnormality cause determination process (step S105) in the example embodiment of the present invention.

FIG. 5 is a flowchart illustrating details of the abnormality cause determination process (step S105) in the example embodiment of the present invention.

First, the determination unit 114 initializes (sets to zero) a counter for counting the number of changed correlation functions (step S201).

The determination unit 114 selects one pair from the pairs of metrics related to correlation functions included in the monitoring model 132 (step S202).

The determination unit 114 determines whether there is a correlation function related to the same pair as the selected pair of metrics in the comparison model 133 (step S203).

When there is a correlation function related to the same pair in step S203 (step S203/Y), the determination unit 114 determines whether the correlation function has changed between the monitoring model 132 and the comparison model 133 (step S204).

In this step, the determination unit 114 determines that the correlation function has changed, for example, in a case where one of the following conditions is satisfied. 1) Values of at least one of the parameter n, m, k in the expression of Math 1 are different between the monitoring model 132 and the comparison model 133. In other words, ranges on the time axis of the input and output metrics x (t), y (t) upon which the output metric y (t) depends are different, or the input and output metrics x (t), y (t) upon which the output metric y (t) depends have been moved on the time axis. In this case, it is considered that the correlation function has changed on the time axis due to stagnation of flow, or the like, in a pipe, for example. 2) A difference of at least one of the coefficients $a_i$, $b_j$, c in the expression of Math 1 between the monitoring model 132 and the comparison model 133 is equal to or more than a predetermined threshold value. In other words, the dependencies for the input and output metrics x (t), y (t) at each time upon which the output metric y (t) depends are different. In this case, it is considered that the correlation function has changed in an absolute value direction due to clogging, or the like, in a pipe, for example.

When it is determined that the correlation function has changed, in step S204 (step S204/Y), the determination unit 114 adds one to the counter (step S205).

The determination unit 114 repeats the processing from step S202 for all the pairs of metrics related to the correlation functions included in the monitoring model 132 (step S206).

After the processing for all the pairs of metrics has been performed, when the value of the counter is equal to or more than a predetermined threshold value (step S207/Y), the determination unit 114 determines that the cause of the abnormality is "relationship change" due to aged deterioration (step S208), and terminates the processing.

On the other hand, when there is not a correlation function related to the same pair in step S203 (step S203/N), the determination unit 114 determines that the cause of the abnormality is "failure" of the target system 500 (step S209), and terminates the processing.

Figure 8:
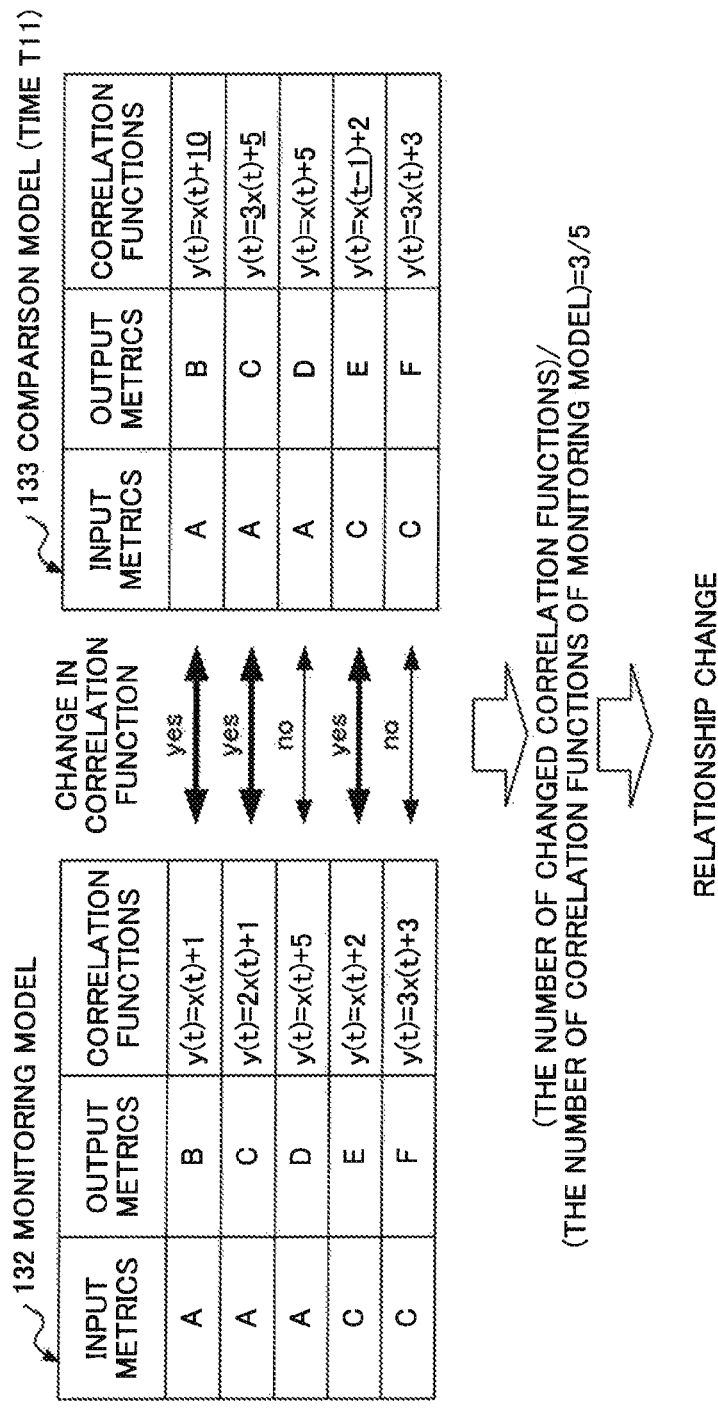
FIG. 8 is a diagram illustrating an example of abnormality cause determination in the example embodiment of the present invention.

FIG. 8 is a diagram illustrating an example of abnormality cause determination in the example embodiment of the present invention.

For example, when the monitoring model 132 in FIG. 6 and the comparison model 133 in FIG. 7 are compared, the comparison model 133 includes correlation functions related to the same pairs as respective pairs of metrics included in the monitoring model 132. In addition, the correlation functions of three pairs "A, B", "A, C", and "C, E" among the five pairs of metrics included in the monitoring model 132 have changed. When the threshold value for determining the "relationship change" is 20% of the number of pairs of metrics included in the monitoring model 132, the determination unit 114 determines that the cause of the abnormality is "relationship change".

Next, the determination unit 114 registers a determination result ("failure", "relationship change") into the determination result history 134 of the determination result storage unit 124 (step S106). The determination unit 114 also stores a relation expression comparison result 135 in the determination result storage unit 124.

FIG. 9 is a diagram illustrating an example of the determination result history 134 in the example embodiment of the present invention. FIG. 10 is a diagram illustrating an example of the relation expression comparison result 135 in the example embodiment of the present invention.

For example, the determination unit 114 registers a determination result "relationship change" for the abnormality detection time T11 into the determination result history 134, as illustrated in FIG. 9. The determination unit 114 saves a relation expression comparison result 135a for the abnormality detection time T11, as illustrated in FIG. 10.

The determination unit 114 outputs a determination result to the user or the like via the output unit 115 (step S107).

Figure 11:
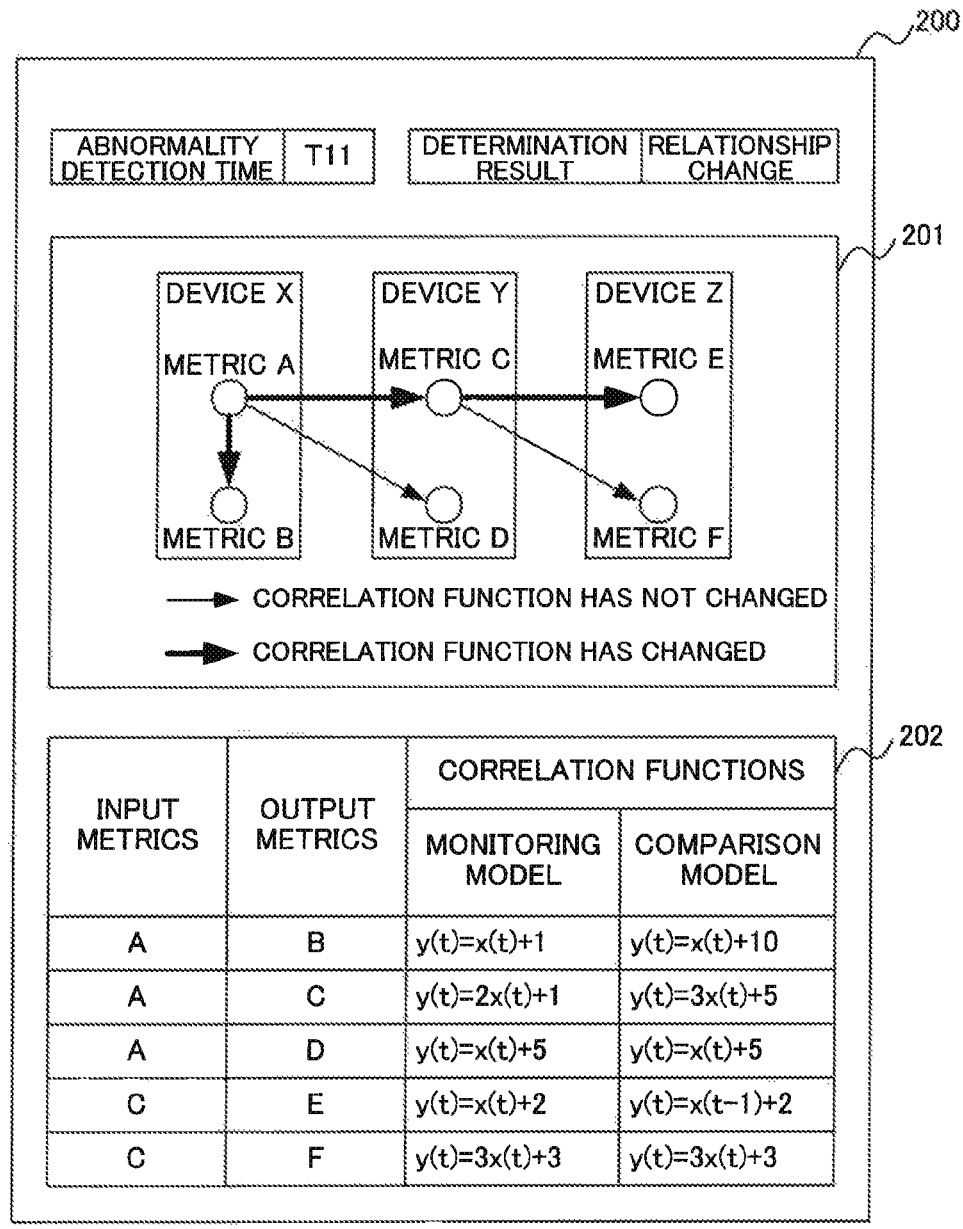
FIG. 11 is a diagram illustrating an example of a determination result screen 200 in the example embodiment of the present invention.

FIG. 11 is a diagram illustrating an example of a determination result screen 200 in the example embodiment of the present invention. In the example of FIG. 11, the determination result screen 200 includes a relation expression comparison area 201 and a relation expression display area 202. In the relation expression comparison area 201, whether each correlation function between the monitoring model 132 and the comparison model 133 has changed or not is indicated, in association with metrics related to the corresponding correlation function and an apparatus in which values of the metrics are measured. In the relation expression display area 202, respective correlation functions included in the monitoring model 132 and the comparison model 133 are indicated.

For example, the output unit 115 generates the determination result screen 200 as illustrated in FIG. 11 based on the determination result history 134 of FIG. 9 and the relation expression comparison result 135a of FIG. 10, and outputs (displays) the determination result screen 200 for the user and the like.

Hereinafter, the processing from step S102 is repeatedly executed.

FIG. 12 is a diagram illustrating another example of the comparison model 133 in the example embodiment of the present invention. In the comparison model 133 of FIG. 12, the correlation functions are set for pairs of input and output metrics "A, B", "A, C", and "A, D".

For example, for an abnormality detected at time T21, the model generation unit 112 generates the comparison model 133 as illustrated in FIG. 12.

Figure 13:
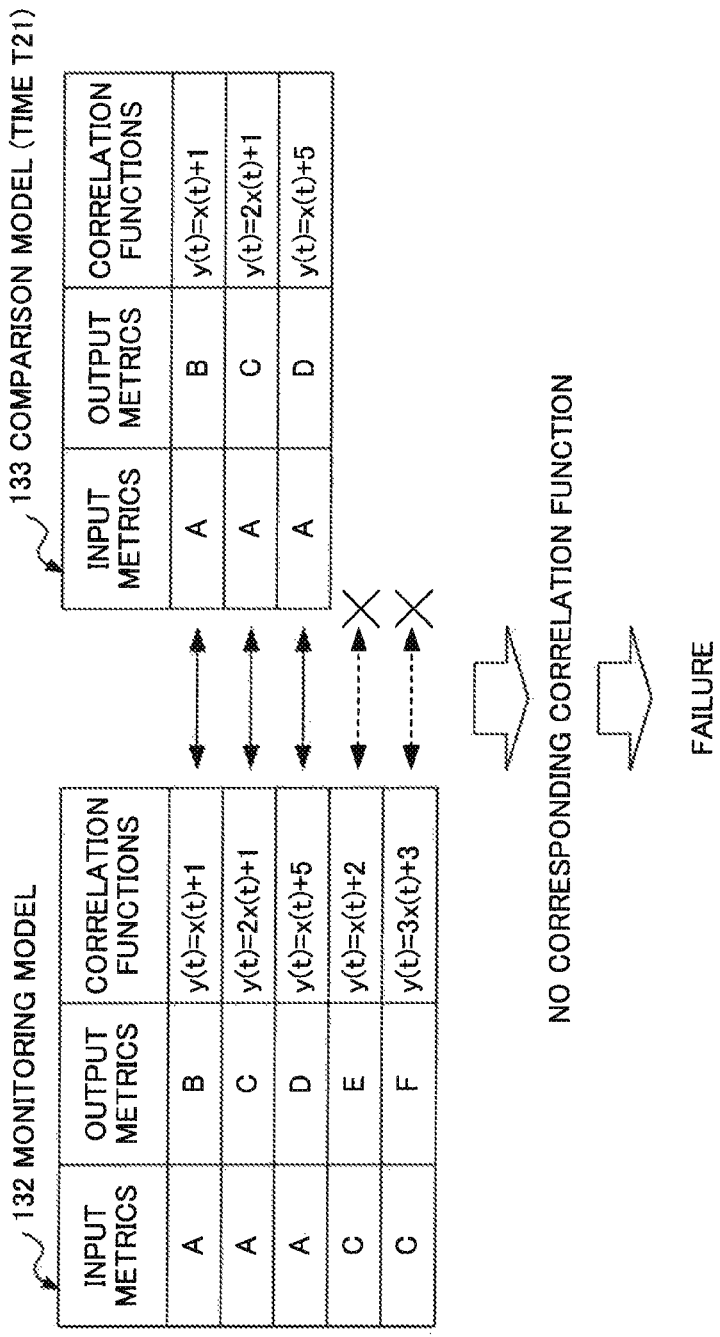
FIG. 13 is a diagram illustrating another example of abnormality cause determination in the example embodiment of the present invention.

FIG. 13 is a diagram illustrating another example of abnormality cause determination in the example embodiment of the present invention.

For example, when the monitoring model 132 in FIG. 6 and the comparison model 133 in FIG. 13 are compared, the comparison model 133 does not include correlation functions related to the same pairs as respective pairs of metrics "C, E", "C, F included in the monitoring model 132.

Therefore, the determination unit 114 determines that the cause of the abnormality is "failure". Then, the determination unit 114 registers a determination result "failure" for the abnormality detection time T21 in the determination result history 134, as illustrated in FIG. 9. The determination unit 114 saves a relation expression comparison result 135b for the abnormality detection time T21, as illustrated in FIG. 10.

Figure 14:
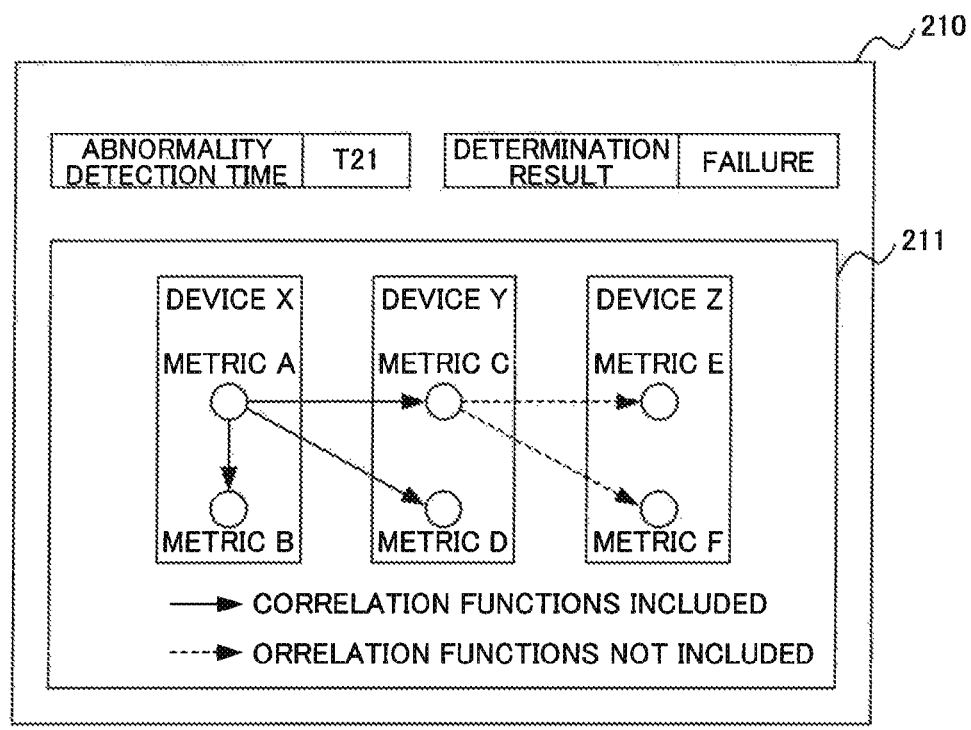
FIG. 14 is a diagram illustrating another example of a determination result screen 200 in the example embodiment of the present invention.

FIG. 14 is a diagram illustrating another example of a determination result screen 210 in the example embodiment of the present invention. In the example of FIG. 14, the determination result screen 210 includes a relation expression comparison area 211. In the relation expression comparison area 211, whether the comparison model 133 includes each correlation function included in the monitoring model 132 or not is indicated, in association with metrics related to the corresponding correlation function and an apparatus in which values of the metrics are measured.

For example, the output unit 115 generates the determination result screen 210 as illustrated in FIG. 14 based on the determination result history 134 of FIG. 9 and the relation expression comparison result 135b of FIG. 10, and outputs (displays) the determination result screen 210 for the user and the like.

It is noted that the output unit 115 may further display a history of the determination results indicated by the determination result history 134, in response to a request from the user or the like. The output unit 115 may display the determination result screens 200, 210 for an abnormality detection time designated by the user or the like, in response to a request from the user or the like.

Hereinabove, the operation of the example embodiment of the present invention is completed.

In the example embodiment of the present invention, a correlation model is used as a model. However, without limiting thereto, other models based on techniques well known in the field of statistical processing may be used as a model, as long as a statistical relationship among metrics can be expressed. For example, a linear or nonlinear model such as an autoregressive model, a logistic regression model, or a probability distribution model may be used as a model.

The determination unit 114 determines that a target relationship is indicated in the comparison model 133 when the comparison model 133 includes correlation functions of all the pairs of metrics of the monitoring model 132. However, without limiting thereto, the determination unit 114 may determine that the target relationship is indicated in the comparison model 133 when the comparison model 133 includes correlation functions of pairs whose number is equal to or more than a predetermined threshold value, among pairs of metrics in the monitoring model 132.

The determination unit 114 determines that a target relationship is not indicated in the comparison model 133 when the comparison model 133 does not include a correlation function for at least one pair among the pairs of metrics in the monitoring model 132. However, without limiting thereto, the determination unit 114 may determine that the target relationship is not indicated in the comparison model 133 when the comparison model 133 does not include correlation functions of pairs whose number is equal to or more than a predetermined threshold value, among pairs of metrics in the monitoring model 132.

The determination unit 114 determines that a cause of an abnormality is "relationship change", in the case where a target relationship is indicated in the comparison model 133 and the number of changed correlation functions is equal to or more than a predetermined threshold value. However, without limiting thereto, the determination unit 114 may determine that the cause of the abnormality is "relationship change" without detecting the changed correlation functions, in the case where the target relationship is indicated in the comparison model 133 at detection of the abnormality of the target system 500.

In the example embodiment of the present invention, a change of correlation function is detected based on a change in parameters and coefficients. However, without limiting thereto, the change of correlation function may be detected based on a possible range of a value of output metric y (t) for a defined range of a value of input metric x (t). In this case, the change of the correlation function is determined in the case where a difference of the possible ranges of the value of output metric y (t) between the monitoring model 132 and the comparison model 133 is equal to or more than a predetermined threshold value, for example.

In the example embodiment of the present invention, at detection of an abnormality of the target system 500, the comparison model 133 is generated, and the monitoring model 132 and the comparison model 133 are compared. However, without limiting thereto, the comparison model 133 may be generated with a regular interval, for example, even if an abnormality of target system 500 is not detected. In this case, the determination unit 114 may determine a change in a target relationship in the case where the number of changed correlation functions between the monitoring model 132 and the comparison model 133 is equal to or more than a predetermined threshold value.

In the example embodiment of the present invention, a case of target system 500 being a plant is described as an example. However, without limiting thereto, the target system 500 may be an information technology (IT) system including one or more computers as long as values of a plurality of metrics of monitoring targets can be obtained. In this case, the metrics may include usage rates and usage amounts of computer resources or network resources such as a CPU usage rate, a memory usage rate, a disk access frequency, and the like. The target system 500 may be a system of a power plant, communication equipment of a carrier, or mobile bodies such as an automobile, a train, an aircraft, and a ship. The target system 500 may be a structures such as a building or a bridge.

Figure 1:
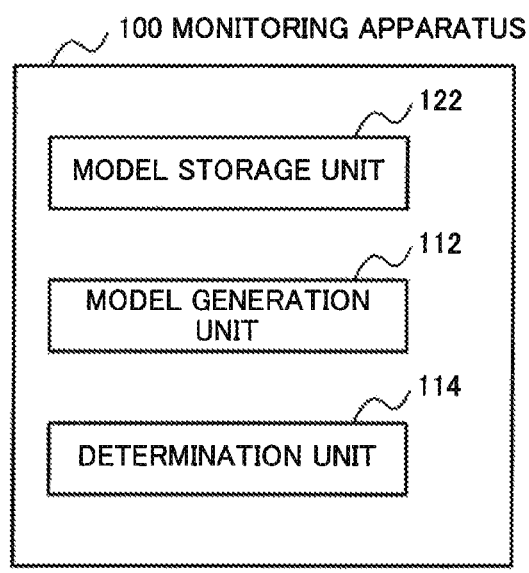
FIG. 1 is a block diagram illustrating a characteristic configuration of an example embodiment of the present invention.

Next, a characteristic configuration of an example embodiment of the present invention will be disclosed. FIG. 1 is a block diagram illustrating a characteristic configuration of the example embodiment of the present invention.

A monitoring apparatus 100 (information processing apparatus) includes a model storage unit 122, a model generation unit 112, and a determination unit 114. The model storage unit 122 stores a monitoring model 132 (first model) that is a model for one point in time. The model indicates a relationship among a plurality of metrics of a system. The model generation unit 112 generates a comparison model 133 (second model) that is the model for a point in time at which the relationship among the plurality of metrics does not conform to the monitoring model 132. The determination unit 114 determines that the relationship among metrics in the system has changed in a case where the comparison model 133 indicates the relationship among metrics among which the monitoring model 132 indicates the relationship, and outputs a result of the determination.

Next, advantageous effects of the example embodiment of the present invention will be described.

According to the example embodiment of the present invention, it is possible to determine whether an abnormality of a system is caused by a failure or aged deterioration. This is because the model generation unit 112 generates the comparison model 133 at detection of an abnormality of the system, and the determination unit 114 determines that a relationship in the system has changed in the case where the comparison model 133 indicates a relationship among metrics among which the monitoring model 132 indicates a relationship.

According to the example embodiment of the present invention, it is possible to allow the users and the like to easily find a situation of aged deterioration. This is because the output unit 115 displays a determination result screen 200 to indicate whether each correlation function has changed or not between the monitoring model 132 and the comparison model 133 and each correlation function included in the monitoring model 132 and the comparison model 133.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-052214, filed on Mar. 16, 2015, the disclosure of which is incorporated herein in its entirety by reference.

REFERENCE SIGNS LIST 1 monitoring system
100 monitoring apparatus
101 CPU
102 storage device
103 communication device
104 input device
105 output device
111 monitoring data collection unit
112 model generation unit
113 analysis unit
114 determination unit
115 output unit
121 monitoring data storage unit
122 model storage unit
124 determination result storage unit
132 monitoring model
133 comparison model
134 determination result history
135 relation expression comparison result
200 determination result screen
201 relation expression comparison area
202 relation expression display area
210 determination result screen
211 relation expression comparison area
500 target system
501 sensor

The invention claimed is:

1. An information processing apparatus for detection of an abnormality in a plant system, comprising:
a memory with instructions stored therein; and
one or more processors configured to execute the instructions, said instructions configured to, upon execution by the one or more processors, cause the processors to:
store a first model that is a model for one point in time, said first model indicating a relationship among a plurality of metrics of the plant system,
monitor the plant system using the first model to detect for an abnormality resulting from the first model,
upon detection of the abnormality resulting from the first model, generate a second model that is a model for a point in time at which the abnormality occurred, and
in an event where the second model indicates the relationship among the metrics among which the first model indicates the relationship as a result of the comparison, determine that the abnormality is caused by aged deterioration and output a result of the determination via an output device,
wherein the model indicates the relationship among the plurality of metrics with one or more relation expressions each between a value of one metric and a value of another metric among the plurality of metrics,
wherein the instructions are further configured to:
determine that the second model indicates the relationship among the metrics among which the first model indicates the relationship in a case where the second model includes one or more relation expressions for same pairs as pairs of metrics included in the first model, and
determine that the relationship among metrics in the plant system has changed in a case where the second model includes one or more relation expressions for the same pairs as pairs of metrics included in the first model, and a number of relation expressions changed between the first model and the second model among the relation expressions for the same pairs is equal to or more than a predetermined threshold value,
and wherein the relation expression is expressed by $$y(t) = \sum_{i=1}^{n} a_i y(t-i) + \sum_{j=1}^{m} b_j x(t-k-j) + c,$$

in which
x (t) is a value of the one metric at a time t,
y (t) is a value of the another metric at the time t,
n, m, and k are parameters wherein
n is an integer equal to or more than one,
m is an integer equal to or more than one, and
k is an integer equal to or more than zero, and

13

$a_i(1 \le i \le n)$, $b_j(1 \le j \le m)$, and c are coefficients, and
the instructions are further configured to:
  determine that the relation expression for the same pair has changed in a case where, between the first model and the second model, a difference in any one of the coefficients $a_i$, $b_j$, and c of the relation expression for the same pair is equal to or more than a predetermined threshold value or any one of the parameters n, m, k of the relation expression for the same pair has changed.

2. The information processing apparatus according to claim 1, wherein the instructions are further configured to:
  determine that the abnormality is caused by a failure of the plant system in a case where the second model does not indicate the relationship among the metrics among which the first model indicates the relationship.

3. The information processing apparatus according to claim 1, wherein the instructions are further configured to:
  output the changed relation expressions of the first model and the second model.

4. The information processing apparatus according to claim 2, wherein
  the model indicates the relationship among the plurality of metrics with one or more relation expressions each between a value of one metric and a value of another metric among the plurality of metrics, and
  the instructions are further configured to:
    determine that the second model indicates the relationship among the metrics among which the first model indicates the relationship in a case where the second model includes one or more relation expressions for same pairs as pairs of metrics included in the first model.

5. An information processing method for detection of an abnormality in a plant system, comprising steps of:
  storing a first model that is a model for one point in time, said first model indicating a relationship among a plurality of metrics of the plant system;
  monitoring the plant system using the first model to detect for an abnormality resulting from the first model;
  upon detection of the abnormality resulting from the first model, generating a second model that is a model for a point in time at which the abnormality occurred;
  in an event where the second model indicates the relationship among the metrics among which the first model indicates the relationship, determining that the abnormality is caused by aged deterioration and outputting a result of said determining via an output device,
  the model indicating the relationship among the plurality of metrics with one or more relation expressions each between a value of one metric and a value of another metric among the plurality of metrics;
  determining that the second model indicates the relationship among the metrics among which the first model indicates the relationship in a case where the second model includes one or more relation expressions for same pairs as pairs of metrics included in the first model; and
  determining that the relationship among metrics in the plant system has changed in a case where the second model includes one or more relation expressions for the same pairs as pairs of metrics included in the first model, and a number of relation expressions changed between the first model and the second model among the relation expressions for the same pairs is equal to or more than a predetermined threshold value,

14 wherein the relation expression is expressed by $$y(t) = \sum_{i=1}^{n} a_i y(t-i) + \sum_{j=1}^{m} b_j x(t-k-j) + c,$$

in which
x (t) is a value of the one metric at a time t,
y (t) is a value of the another metric at the time t,
n, m, and k are parameters wherein
  n is an integer equal to or more than one,
  m is an integer equal to or more than one, and
  k is an integer equal to or more than zero, and
$a_i(1 \le i \le n)$, $b_j(1 \le j \le m)$, and c are coefficients,
and wherein the method further comprises a step of
  determining that the relation expression for the same pair has changed in a case where, between the first model and the second model, a difference in any one of the coefficients $a_i$, $b_j$, and c of the relation expression for the same pair is equal to or more than a predetermined threshold value or any one of the parameters n, m, k of the relation expression for the same pair has changed.

6. A non-transitory computer readable storage medium having recorded thereon a program that, upon execution by a computer, causes the computer to perform steps for detection of an abnormality in a plant system comprising:
  storing a first model that is a model for one point in time, said first model indicating a relationship among a plurality of metrics of the plant system;
  monitoring the plant system using the first model to detect for an abnormality resulting from the first model;
  upon detection of the abnormality resulting from the first model, generating a second model that is a model for a point in time at which the abnormality occurred;
  in an event where the second model indicates the relationship among the metrics among which the first model indicates the relationship, determining that the abnormality is caused by aged deterioration and outputting a result of said determining via an output device,
  the model indicating the relationship among the plurality of metrics with one or more relation expressions each between a value of one metric and a value of another metric among the plurality of metrics;
  determining that the second model indicates the relationship among the metrics among which the first model indicates the relationship in a case where the second model includes one or more relation expressions for same pairs as pairs of metrics included in the first model; and
  determining that the relationship among metrics in the plant system has changed in a case where the second model includes one or more relation expressions for the same pairs as pairs of metrics included in the first model, and a number of relation expressions changed between the first model and the second model among the relation expressions for the same pairs is equal to or more than a predetermined threshold value,
wherein the relation expression is expressed by $$y(t) = \sum_{i=1}^{n} a_i y(t-i) + \sum_{j=1}^{m} b_j x(t-k-j) + c,$$

in which x (t) is a value of the one metric at a time t, y (t) is a value of the another metric at the time t, n, m, and k are parameters wherein
- n is an integer equal to or more than one,
- m is an integer equal to or more than one, and
- k is an integer equal to or more than zero, and $a_i(1 \leq i \leq n)$, $b_j(1 \leq j \leq m)$, and c are coefficients, and wherein the program further causes the computer to perform a step of determining that the relation expression for the same pair has changed in a case where, between the first model and the second model, a difference in any one of the coefficients $a_i$, $b_j$, and c of the relation expression for the same pair is equal to or more than a predetermined threshold value or any one of the parameters n, m, k of the relation expression for the same pair has changed.

* * * * *